United States Patent [19]

Matsunaga

[11] Patent Number: 5,485,336
[45] Date of Patent: Jan. 16, 1996

[54] MAGNETIC RECORDING AND/OR REPRODUCING HEAD WITH SLIDER

[75] Inventor: Hiroshi Matsunaga, Kunitachi, Japan

[73] Assignee: TEAC Corporation, Japan

[21] Appl. No.: 306,215

[22] Filed: Sep. 14, 1994

Related U.S. Application Data

[63] Continuation of Ser. No. 909,147, Jul. 6, 1992, abandoned.

[30]    Foreign Application Priority Data

Jul. 10, 1991  [JP]  Japan .................................. 3-170158

[51] Int. Cl.⁶ .................................................... G11B 5/193
[52] U.S. Cl. ............................................ 360/125; 360/103
[58] Field of Search .................................. 360/125, 122, 360/102, 103, 119; 29/603

[56]              References Cited

U.S. PATENT DOCUMENTS

| | | | |
|---|---|---|---|
| 4,933,795 | 6/1990 | Nigam | 360/121 |
| 5,012,572 | 5/1991 | Matsuzawa et al. | 360/122 |
| 5,020,213 | 6/1991 | Aronoff et al. | 29/603 |
| 5,173,821 | 12/1992 | Maloney | 360/119 |

FOREIGN PATENT DOCUMENTS

63-22647   2/1988   Japan .

*Primary Examiner*—Stuart S. Levy
*Assistant Examiner*—Paul J. Ditmyer
*Attorney, Agent, or Firm*—Andrus, Sceales, Starke & Sawall

[57]             ABSTRACT

A magnetic head comprises cores made of a magnetic substance that forms a magnetic circuit via a gap when a magnetic flux is induced there. The magnetic head also comprises a plurality of coils that are wound around the cores and induce a magnetic flux in the cores when a electric current is supplied thereto. The magnetic head also comprises a slider made of a magnetic substance that has as its integral parts a sliding contact portion that is in sliding contact with a magnetic recording medium and a core contact portion that contacts the core and forms, together with the cores, a closed magnetic circuit.

14 Claims, 12 Drawing Sheets

FIG. 14

MAGNETIC RECORDING AND/OR REPRODUCING HEAD WITH SLIDER

The present application is a continuation application of U.S. patent application, Ser. No. 07/909,147, filed Jul. 6, 1992, and now abandoned.

BACKGROUND OF THE INVENTION

The present invention relates to magnetic head for magnetic recording and/or reproducing and more specifically to a magnetic head configured for greater efficiency in production.

Figure 1:
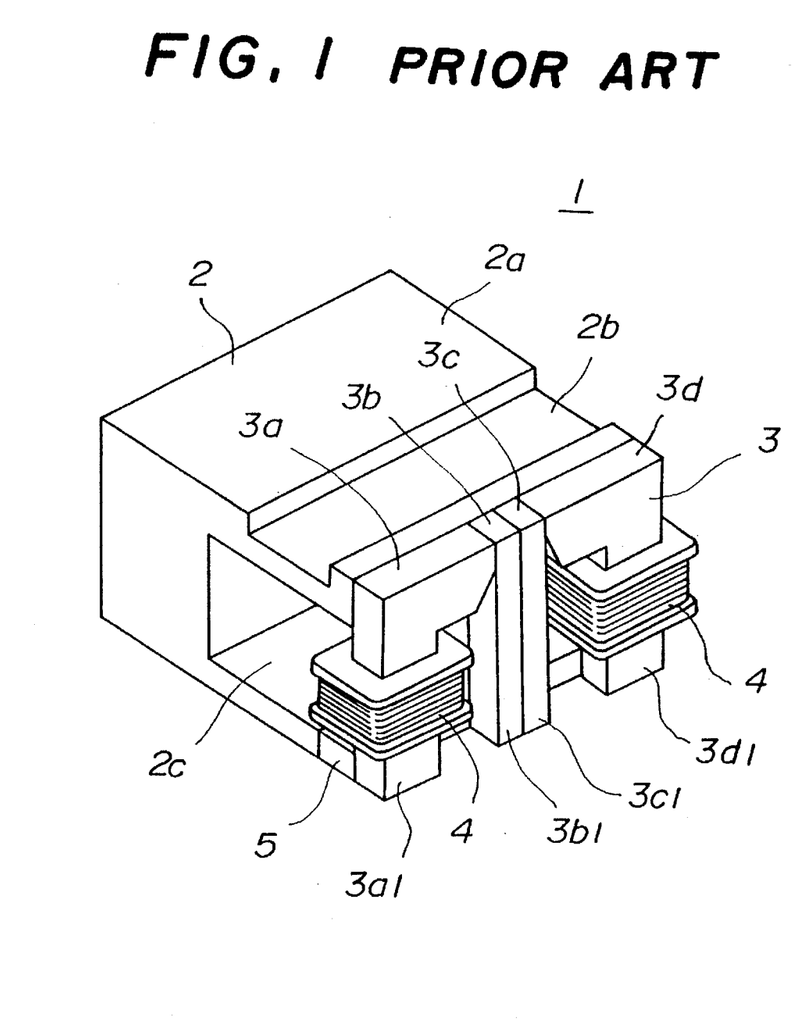
FIG. 1 is a perspective view of a conventional magnetic head.

In a magnetic disk apparatus for conducting a magnetic recording/reproducing of a flexible magnetic disk, for example, a magnetic head I shown in FIG. 1 is fitted on a gimbal plate on upper and lower head arms of a carriage. This magnetic head 1 consists of a ceramic slider 2, a core composite 3 formed of a magnetic substance: such as a ferrite, and a coil 4 assembled width the core composite 3.

The core composite 3 is formed by bonding each of cores 3a–3d.

A back core 5, bonded to a lower lateral face of the core composite 3, is fixed to the slider 2. The slider's sliding contact face 2a, which faces a disk, is provided with a slot 2b parallel to the head face. The slider 2 is also provided with a slot 2c opposite-to the lateral face of the core composite 3.

A description of a fabrication process of the slider 2 is given below. ① A ceramic flat plate is prepared by cutting a ceramic material. ② A slot for accepting a back core is formed on a face of the ceramic plate. ③ A ferrite bar for use as a back core is prepared by cutting a ferrite material. ④ The ferrite bar is bonded to the slot formed in ②. ⑤ The topside of the ceramic plate face, which is bonded to the core composite 3, is mirror finished. ⑥ The aforementioned slot 2c is formed in a ceramic plate face. ⑦ The ceramic plates is cut along this slot into bars. ⑧ The aforementioned slot 2b is formed on the surface of the cut ceramic bar, which surface is to be used as a head. ⑨ The ceramic bar thus provided with the back core 5 and the slots 2b and 2c is cut in the direction at right angles with the longitudinal direction.

Figure 2:
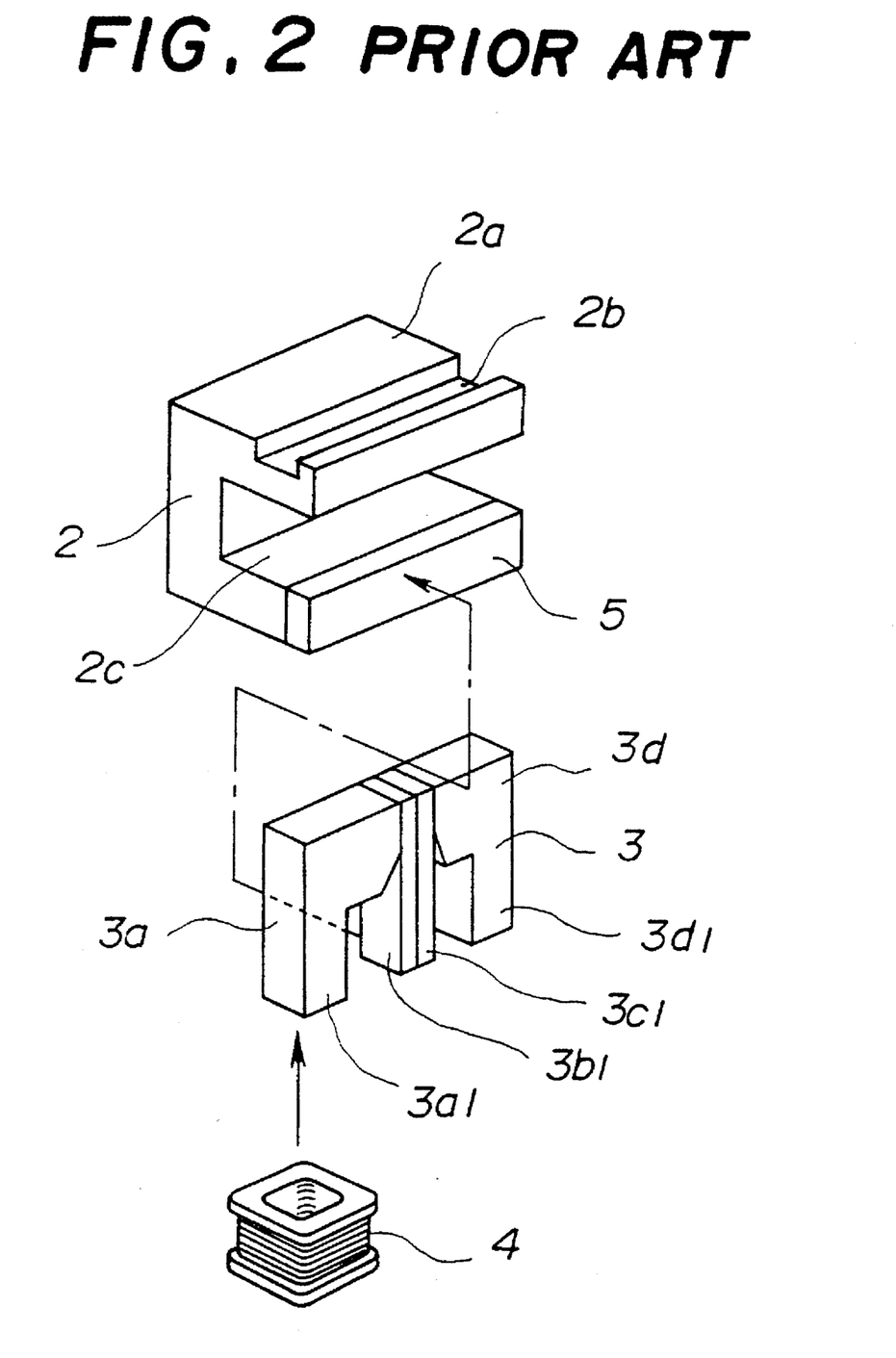
FIG. 2 is an exploded perspective view of a conventional magnetic head.

The above fabrication process ensures that the slider 2 as shown in FIG. 1 is obtained. This slider 2 is bonded to the core composite 3 as shown in FIG. 2.

Figure 3:
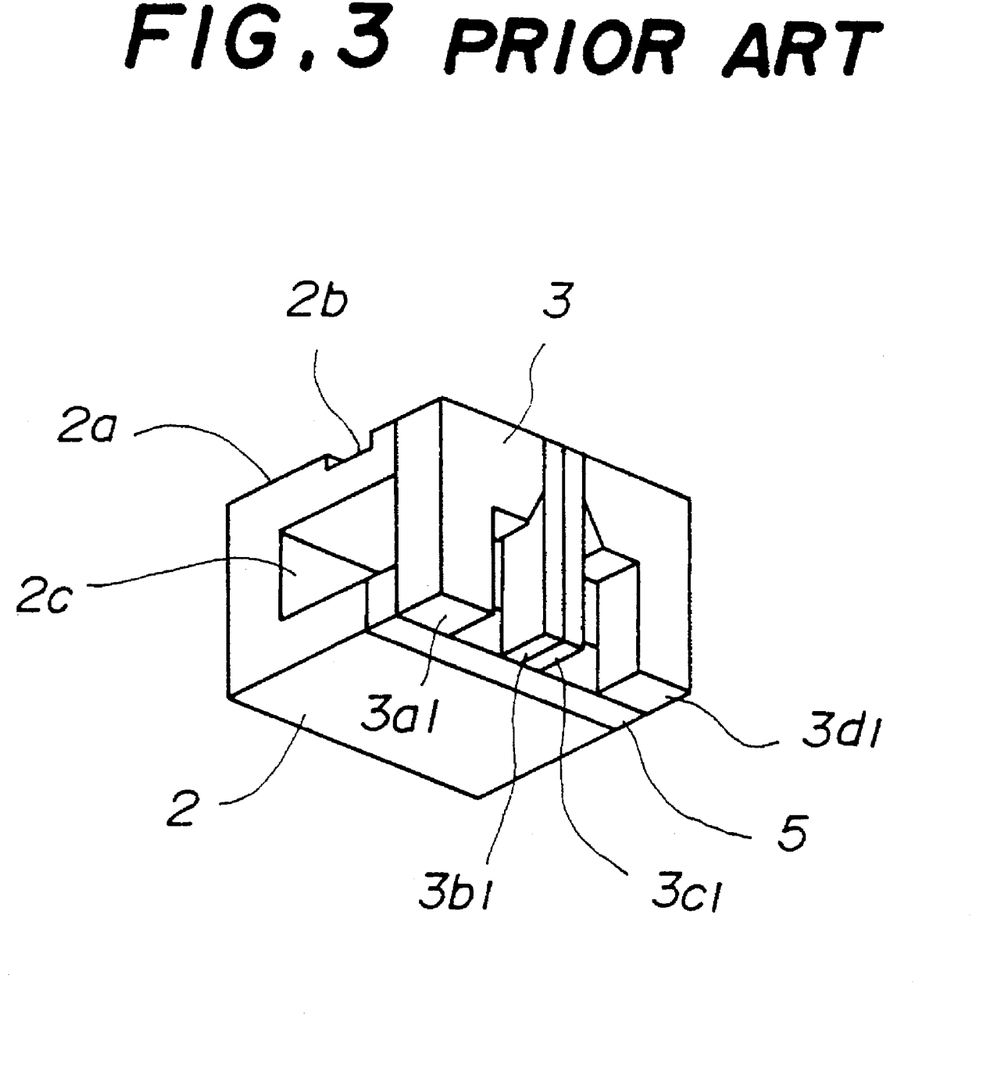
FIG. 3 is a perspective view of a conventional magnetic head showing the bottom of a slider and the bottom of a core composite.

FIG. 3 shows the slider 2 bonded to the core composite 3. In FIG. 3, the bottom of the slider 2 and the bottom of the core composite 3 are visible. As shown in FIG. 3, each of extensions $3a_1$–$3d_1$ of cores 3a–3d is connected to the back core 5 attached to the slider 2. The extensions $3a_1$–$3d_1$ are portions that extend downward from the cores 3a–3d constituting the core composite 3. Because the extensions $3a_1$–$3d_1$ of the cores 3a–3d are connected to the back core 5, the cores 3a–3d and the back core 5 together form a closed magnetic circuit.

The production of a conventional magnetic head is bound to require ceramic working processes of ①–⑥ above. It is thus very time-consuming to obtain the slider 2. Therefore, the conventional technology has a disadvantage in that an improvement in an efficiency of the production of the slider 2 is difficult to attain.

Also, the conventional core composite 3 is formed of a magnetic substance such as a ferrite, while the slider 2 is made of a ceramic, which means that the core composite 3 and the slider 2 have different coefficients of thermal expansion. This difference in their thermal expansion accompanies a generation of a stress at a portion at which the core composite 3 and the slider 2 are bonded. This stress creates a strain in the core composite 3. Due to this strain, a magnetic property of the core composite 3 can deteriorate.

A deterioration of the magnetic property of the core composite 3 can sometimes cause phenomena such as this: even when a predetermined amount of current is passed through the coil 4, a magnetic field of a predetermined magnitude is not induced in a gap portion of the core composite 3.

SUMMARY OF THE INVENTION

Accordingly, a general object of the present invention is to provide a magnetic head capable of allowing more efficient production. In order to achieve this object, a magnetic head of the present invention comprises:

a core which has a gap, is made of a magnetic substance, and forms a magnetic circuit via the gap when a magnetic flux is induced there;

a plurality of coils, each of which is wound around the core and induces a flux in the core by being supplied with an electric current; and a slider which is made of a magnetic substance and has, as its integral parts, a sliding contact portion that is in sliding contact with a magnetic recording medium and a core contact portion that contacts the core so as to form a closed magnetic circuit together with the core.

A magnetic head of the present invention is configured such that a slider made of a magnetic substance forms, together with a core, a closed magnetic circuit and function as a back core of a conventional magnetic head. Accordingly, there is no need to provide a back core separately, thus contributing to reducing the number of parts required in a head. The reduction of the number of parts leads to a reduction of the number of processes in fabricating a magnetic head. Thus an improvement in efficiency in production can be achieved.

A further and more specific object of the present invention is to provide a magnetic head that is free from a stress otherwise generated in a contact portion of a core and a slider due to a difference of coefficients of thermal expansion between those two components, and is thus capable of preventing a deterioration of a magnetic property of a magnetic head, which deterioration arises from this stress. In order to achieve this specific object, a magnetic head of the present invention is configured such that, in addition to the above configuration, a slider is made of the same magnetic substance as a core. This configuration ensures that the coefficients of thermal expansion of the core and the slider are equal, and therefore there is no stress generated at a contact portion thereof with a result that a deterioration of magnetic property is prevented.

A further and more specific object of the present invention is to provide a magnetic recording and/or reproducing apparatus having a high shielding performance in a magnetic head portion against an external magnetic field. In order to achieve this specific object, a magnetic recording and/or reproducing apparatus of the present invention comprises a first magnetic head and a second magnetic head, each having the above-mentioned configuration. The first and second magnetic heads are configured such the cores and sliders of the first and second magnetic heads form a closed magnetic circuit via a magnetic recording medium when the magnetic recording medium is held between the heads.

Thus, in a magnetic recording and/or reproducing apparatus of the present invention, the cores and sliders of two magnetic heads form a closed magnetic circuit via a magnetic recording medium. Accordingly, in such a magnetic recording and/or reproducing apparatus, a shielding performance in the magnetic head portions is high.

Other objects and characteristics of the present invention will be apparent from the detailed descriptions given below in accordance with the attached drawings.

DESCRIPTIONS OF THE PREFERRED EMBODIMENTS

Figure 4:
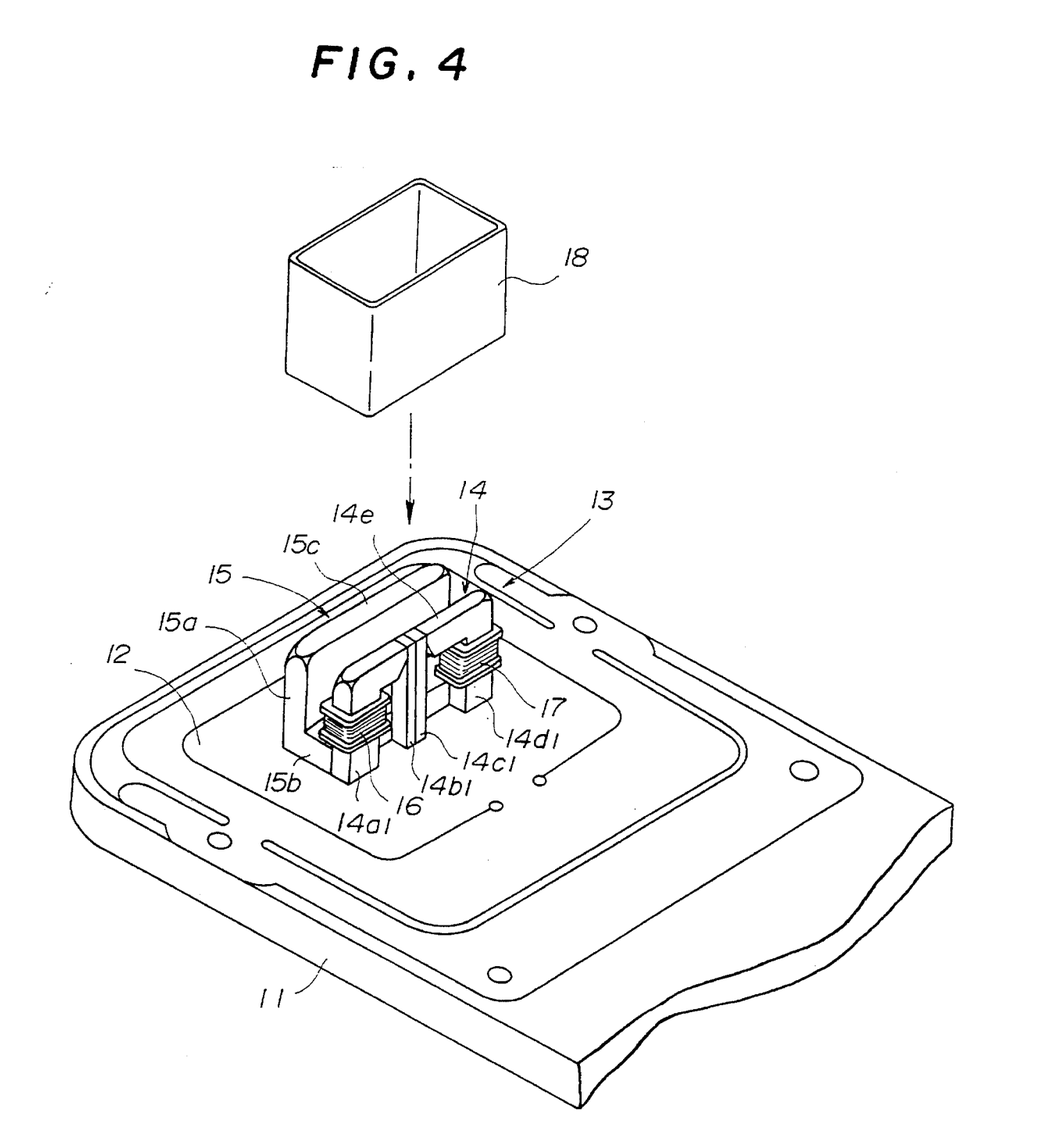
FIG. 4 is a perspective view showing an embodiment of a magnetic head of the present invention fitted on a gimbal plate.
Figure 5:
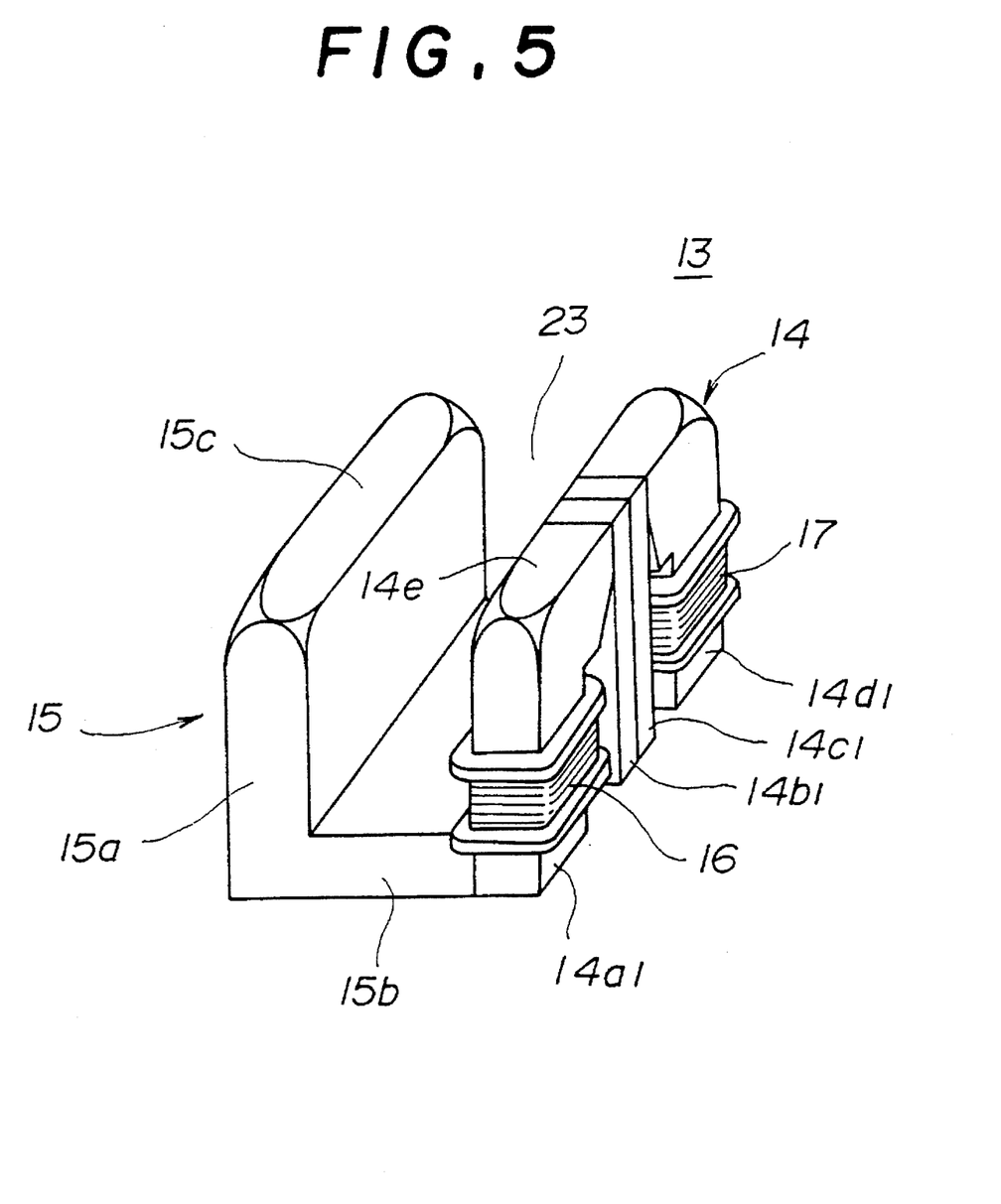
FIG. 5 is a perspective view showing the magnetic head of the present invention enlarged.

FIGS. 4 and 5 illustrate a structure of an embodiment of a magnetic head of the present invention respectively.

In the figures, a gimbal plate 12 is attached to a head arm 11 of a magnetic disk apparatus (not shown in the figures) in which is mounted a magnetic disk comprising a 3.5-inch flexible disk recording medium. The magnetic head 13 is attached to this gimbal plate 12 by an adhesive, for example. This gimbal plate 12 has a known flexibility. The magnetic head 13 attached to the gimbal plate 12 is displaceable. Consequently, the magnetic head 13 is supported by the gimbal plate 12 so as to be in tight contact with a recording face of a disk-like recording medium (not shown in the figure).

The magnetic head 13 has a core composite 14. This core composite 14 has a recording/reproducing gap and an erasing gap. The magnetic head 13 further has a slider 15 made of a magnetic substance such as a ferrite. The magnetic head 13 further has coils 16 and 17 that are wound around the core composite 14. The magnetic head 13 further has a shield ring 18 for encasing the above-mentioned core composite 14, the slider 15, the coils 16 and 17 and shields the external magnetic field.

Figure 14:
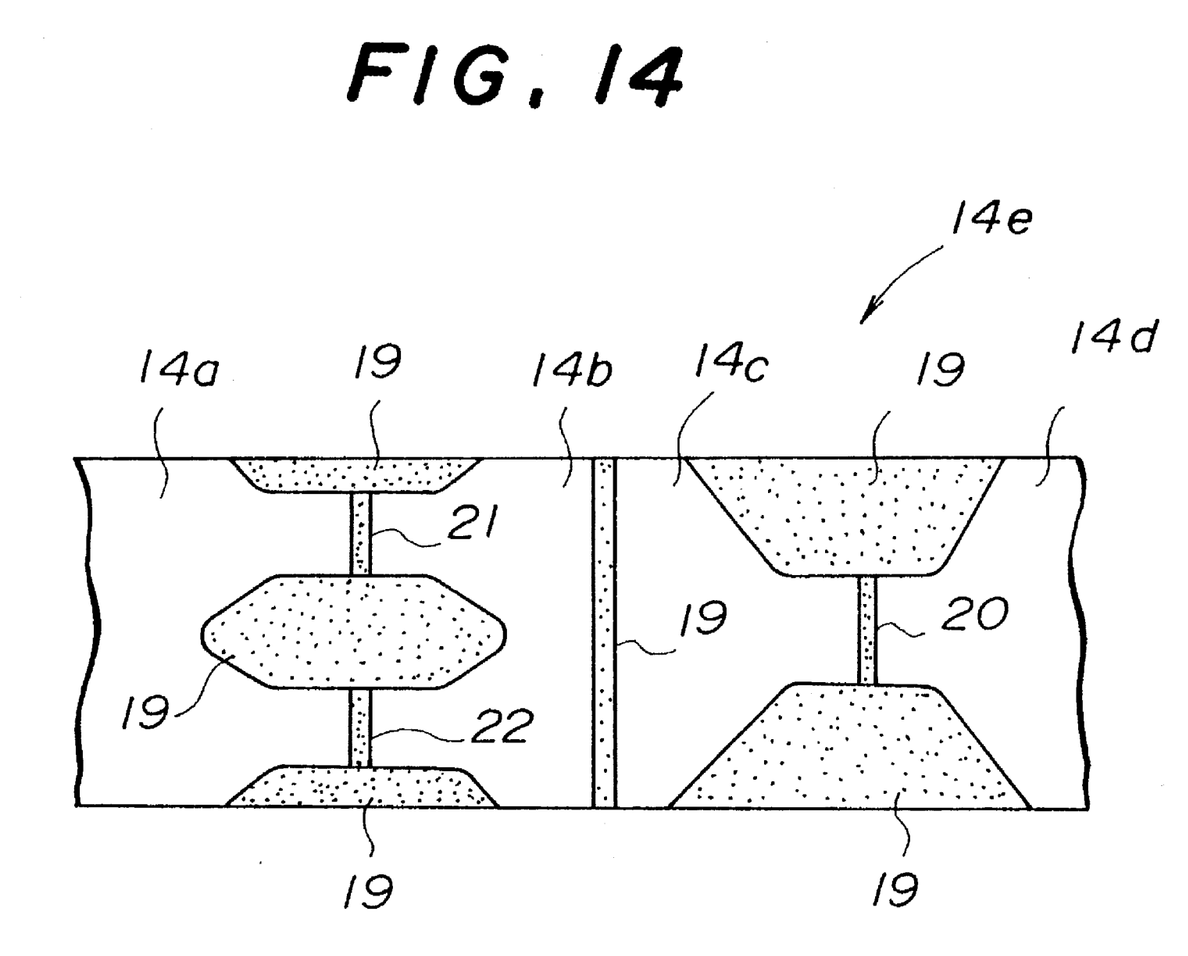
FIG. 14 is a top view showing a gap formed by head faces of the magnetic heads of the present invention.

The core composite 14 has the following configuration. That is, cores 14a–14d made of a magnetic substance such as a ferrite are bonded to each other by fused insulating material 19 such as a glass (shown as satin finished pattern in FIG. 14) at a top end portion as shown in FIG. 5. The core composite 14 having such a configuration is so called a bulk-type magnetic head. As shown in FIG. 14, the head face 14e is provided with a gap 20 for reading/writing purposes and gaps 21 and 22 for erasing purpose. For the sake of simplification, the gaps 20, 21, and 22 and the other seams between the cores on the head face 14e are represented as three lines in figures other than FIG. 14 (FIGS. 4, 5, 11, 12).

Figure 13:
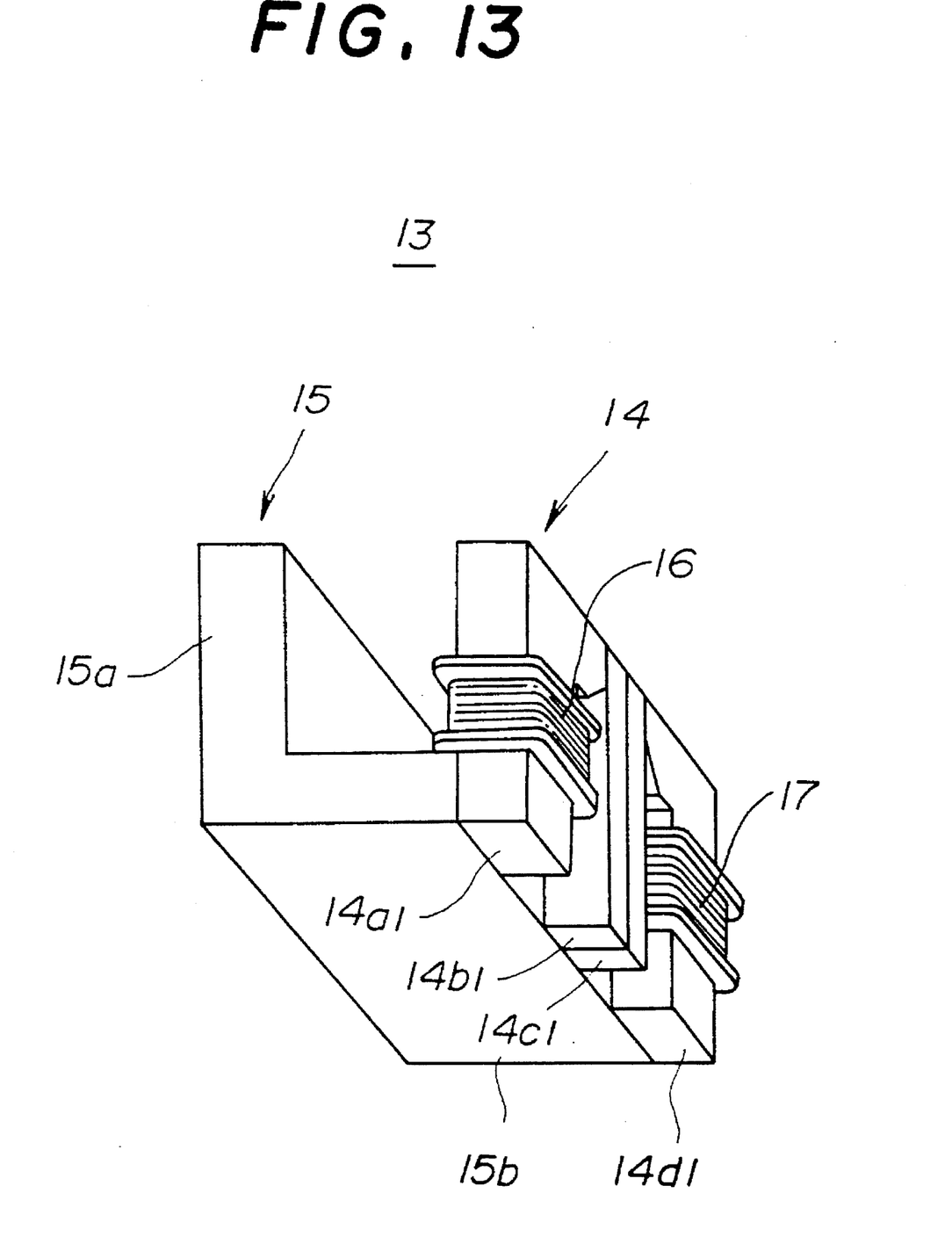
FIG. 13 is a perspective view showing the bottom of the magnetic head shown in FIG. 12.

The coils 16 and 17 are wound around extensions $14a_1$ and $14d_1$ that extend downward from each of the cores 14a and 14d at both ends of the core composite 14. The slider 15 is bonded to the base portions of the left lateral face of each of the extensions $14a_1$–$14d_1$ (see FIG. 13), as shown in FIG. 5.

The slider 15 is configured in the following manner. The slider 15 is composed of the same magnetic substance as the core 14a–14d. Further, the slider 15 is configured to be L-shaped in its cross section, and consists of an extension 15a and an connect portion 15b. The extension 15a extends vertically and in parallel with the core composite 14. The extension 15a extends to a height equal to the head face 14e. The connect portion 15b is connected, as shown in FIG. 5, to the base portions of each of the extensions $14a_1$–$14d_1$ that are the extensions from the cores 14a–14d. The connect portion 15b functions as a core contact portion that is in contact with each of the extensions $14a_1$–$14d_1$ extending from the cores 14a–14d. The connect portion 15b extends horizontally and at right angles with the extension 15a.

On the top end of the extension 15a, a sliding contact portion 15c is formed. This sliding contact portion 15c is configured to be of the same height as the head face 14e. The sliding contact portion 15c functions as a sliding contact portion that is in contact with a magnetic disk (not shown in the figure).

The connect portion 15b attached to the cores 14a–14d also functions as a so-called back core with respect to the core composite 14. The presence of this connect portion 15b eliminates the need for providing back cores individually on a slider. This elimination of back cores acts to reduce the number of parts of the magnetic head 13, thus simplifying the fabrication process of the magnetic head 13.

The above-mentioned function of a back core is defined as short-circuiting the plurality of cores 14a–14d constituting the core composite 14, at the base portions shown in FIG. 5 (the base portions of each of the extensions $14a_1$–$14d_1$). By short-circuiting the plurality of cores 14a–14d at their base portions, a closed magnetic circuit is formed. In such a closed magnetic circuit, magnetic resistance becomes small. Therefore, a magnetic loss arising from establishment of a magnetic field across the magnetic circuit, which field is generated by the cores 14a–14d is small. Thus the energy consumed by the magnetic head 13 can be maintained at a low level.

As described earlier, the slider 15 has an L-shaped cross section. This configuration acts to separate the sliding contact portion 15c from the head face 14e. A space 23 is formed between the sliding contact portion 15c and the head face 14e. When the magnetic head 13 is in sliding contact with a rotating magnetic disk, the rotation of the magnetic disk creates an air current on a surface of the disk. The space 23 acts as a passage of the air current. Therefore, an air resistance of the magnetic head 13 against the air current is reduced.

Four corner portions on the topside of the head face 14e and the sliding contact portion 15c respectively are chamfered. Therefore, any damage to the magnetic disk by its contact with these corner portions is prevented.

Figure 6:
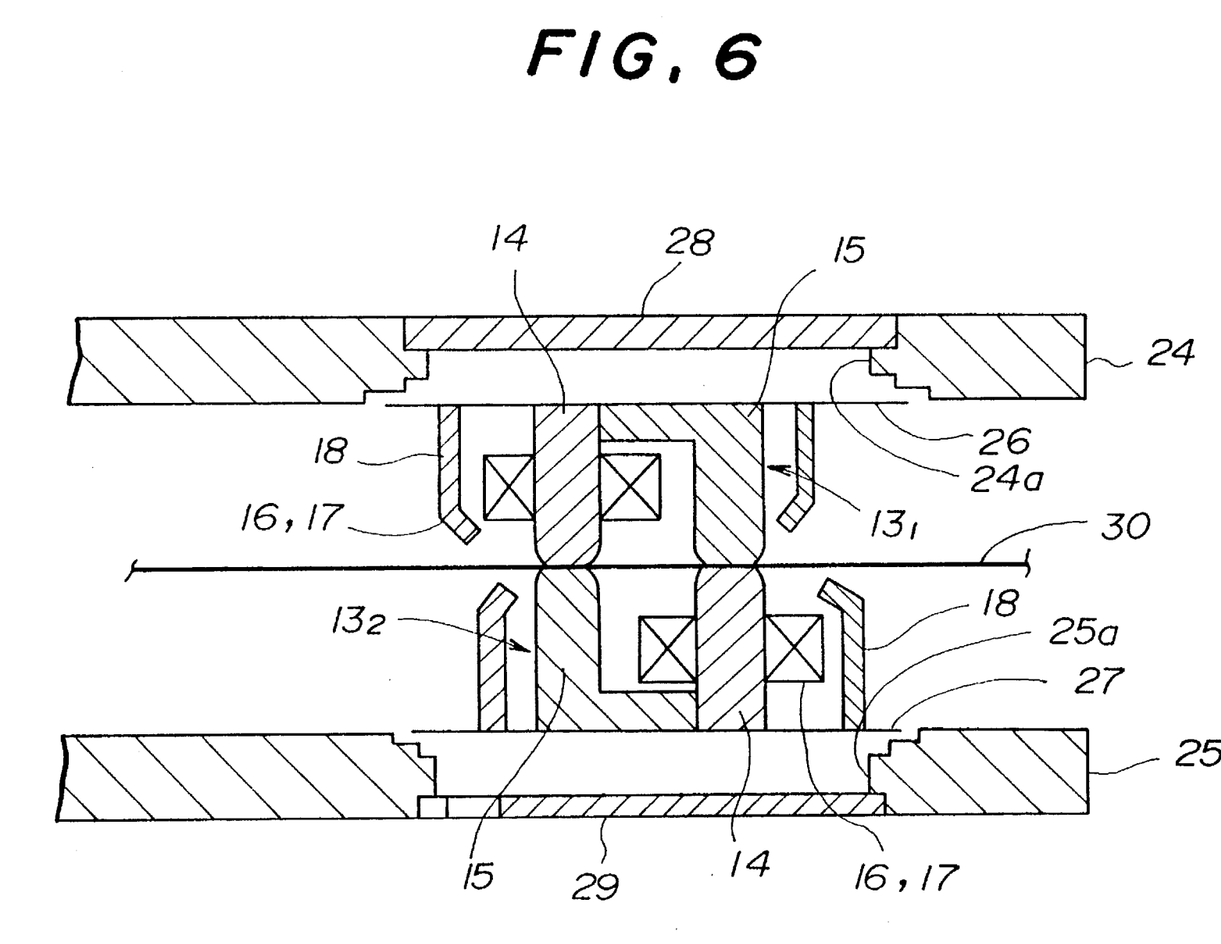
FIG. 6 is a side cross sectional view showing a way the magnetic head of the present invention is used in conducting a magnetic recording/reproducing of a magnetic disk.

As shown in FIG. 6, the magnetic head 13 of the above configuration are provided on an upper arm 24 and a lower arm 25. These upper arm 24 and the lower arm 25 constitute a carriage of a magnetic disk apparatus (not shown in the figure).

That is, a gimbal plate 26 provided on the underside of the upper arm 24 is fitted with a magnetic head $13_1$ as an upper head. A gimbal plate 27 provided on the topside of the lower arm 25 is fitted with a magnetic head 132 as a lower head. Further, each of the arms 24 and 25 are provided with fitting holes 24a and 25a for fitting the gimbal plates 26 and 27. Magnetic shield plate 28 and 29 are provided on the side of the fitting holes 24a and 25a, which side is opposite to the side at which the gimbal plates 26 and 27 are fitted. These magnetic shield plates 28 and 29 have a function of shielding external magnetism.

In such a configuration, the upper arm 24 is moved upwards in FIG. 6 so that the upper magnetic head $13_1$ is separated from the lower magnetic head $13_2$ by a mechanism of the disk apparatus, which mechanism is not shown in the figure. A magnetic disk 30 is placed between the magnetic heads $13_1$ and $13_2$ while this separation is maintained, after which the upper arm 24 is lowered. As shown in FIG. 6, the magnetic disk 30 is supported both from above and below by being sandwiched between the magnetic heads $13_1$ and $13_2$.

The upper magnetic head $13_1$ is fixed in such a way that it is 180 degrees rotated from the orientation of the lower magnetic head $13_2$. With this configuration, the head face 14e of the upper magnetic head $13_1$ is opposite to the sliding contact portion 15c of the lower magnetic head $13_2$. The sliding contact portion 15c of the upper magnetic head $13_1$ is opposite to the head face 14e of the lower magnetic head $13_2$. The magnetic disk 30 is brought to a sliding contact with each of the head faces 14e and the sliding contact portions 15c of the magnetic heads $13_1$ and $13_2$. Thus the disk apparatus records data on the magnetic disk 30 and/or reads data therefrom.

In the above configuration, the head face 14e of the core composite 14 of the magnetic head $13_1$ is opposite to the slider 15 of the other magnetic head 13 via the magnetic disk 30. The slider 15 is made of the same magnetic substance as the core composite 14. The result is that the magnetic heads $13_1$ and $13_2$ form a magnetic circuit that runs through the core composite 14 of the magnetic head $13_1$, the magnetic disk 30, the slider 15 of the other magnetic head $13_2$, the core composite 14 of the magnetic head $13_2$, the magnetic disk 30, the slider 15 of the magnetic head 131, returning again to the core composite 14 of the magnetic head $13_1$. This magnetic circuit is formed by a plurality of contiguous structures, each structures being made of a magnetic substance. Therefore, this magnetic circuit is closed.

If the slider made of a ceramic (non-magnetic substance is utilized, a structure of a non-magnetic substance is interposed in the magnetic circuit above. The magnetic circuit is open at the interposition. The open portion in the magnetic circuit is the cause for magnetic field dispersion. When magnetic field dispersion takes place, a reduction in shielding effect of the magnetic circuit is seen in the portion in which the magnetic field disperses.

Accordingly, the structure of the magnetic head 13 of the present invention, having no such open portion, has higher shielding performance owing to the magnetic circuit than the conventional magnetic head structure. The magnetic head 13 of the present invention is characterized by its imperviousness to noise effect caused by an external magnetic field.

A description of a fabrication process of the magnetic head 13 having the above configuration will be described. The core composite 14 is assembled in the same manner as the conventional magnetic head. Thus a description of the fabrication process of the core composite 14 will be omitted to avoid a repetition.

Figure 7:
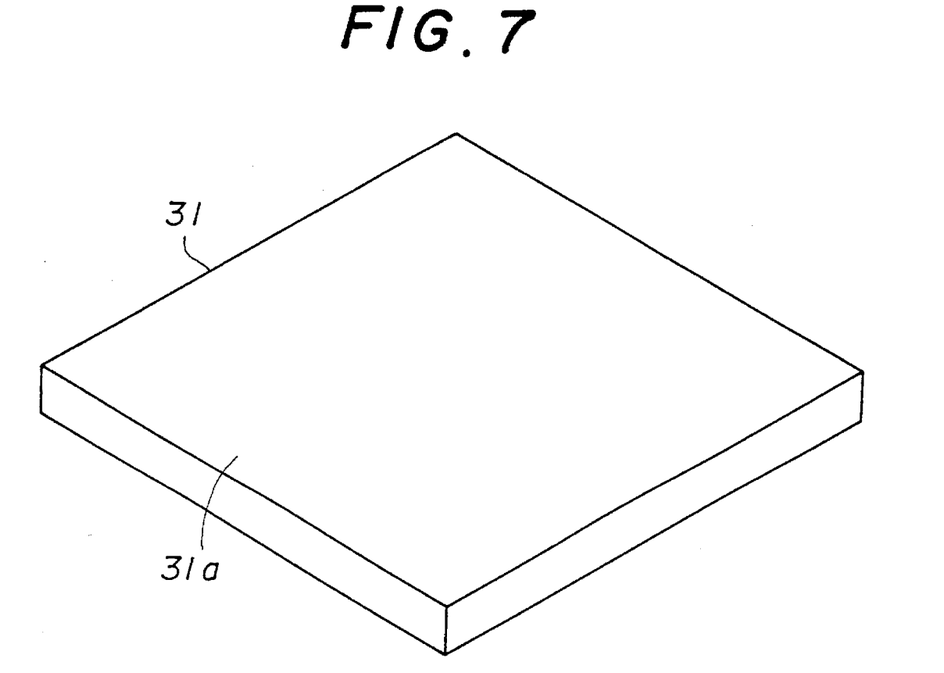
FIG. 7 is a perspective view (1) illustrating one process in a series of processes for fabricating a slider of the magnetic head of the present invention.
Figure 8:
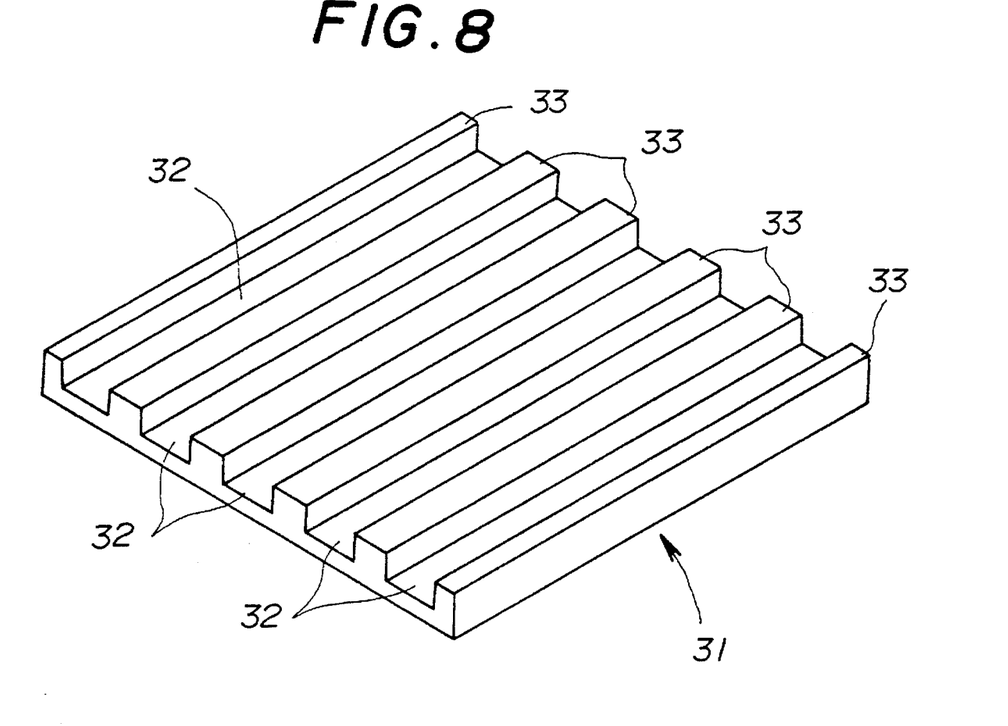
FIG. 8 is a perspective view (2) illustrating one process in a series of processes for fabricating a slider of the magnetic head of the present invention.

In a fabrication process of the slider 15, a flat block 31 of a ferrite material is prepared, as shown in FIG. 7 (process 1). Then slots 32 parallel with a topside 31a of the block 31 are formed (process 2), as shown in FIG. 8. Sliding contact faces 33 that extends along both sides of the slots 32 are formed by being mirror finished (process 3).

Figure 9:
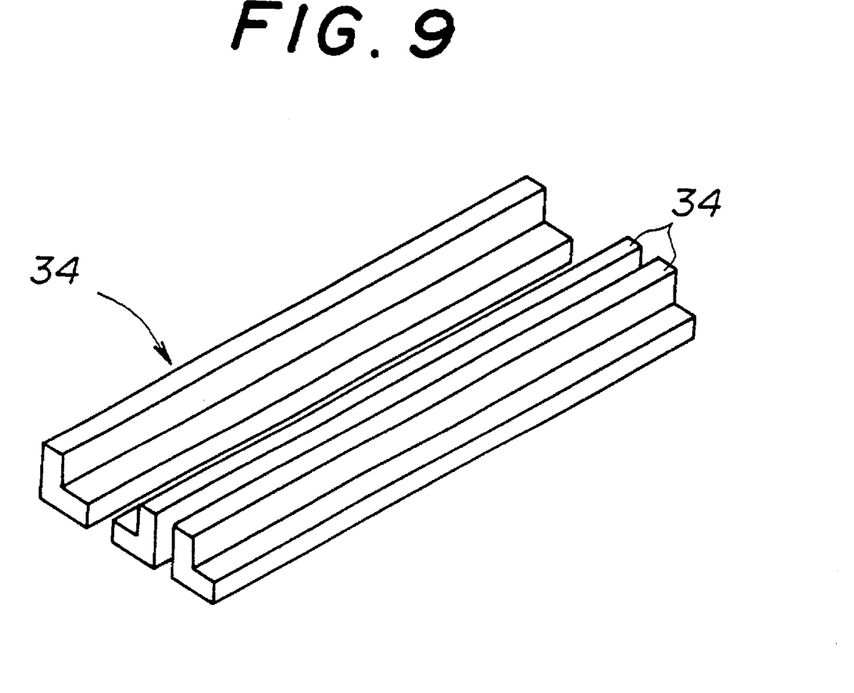
FIG. 9 is a perspective view (3) illustrating one process in a series of processes for fabricating a slider of the magnetic head of the present invention.
Figure 10:
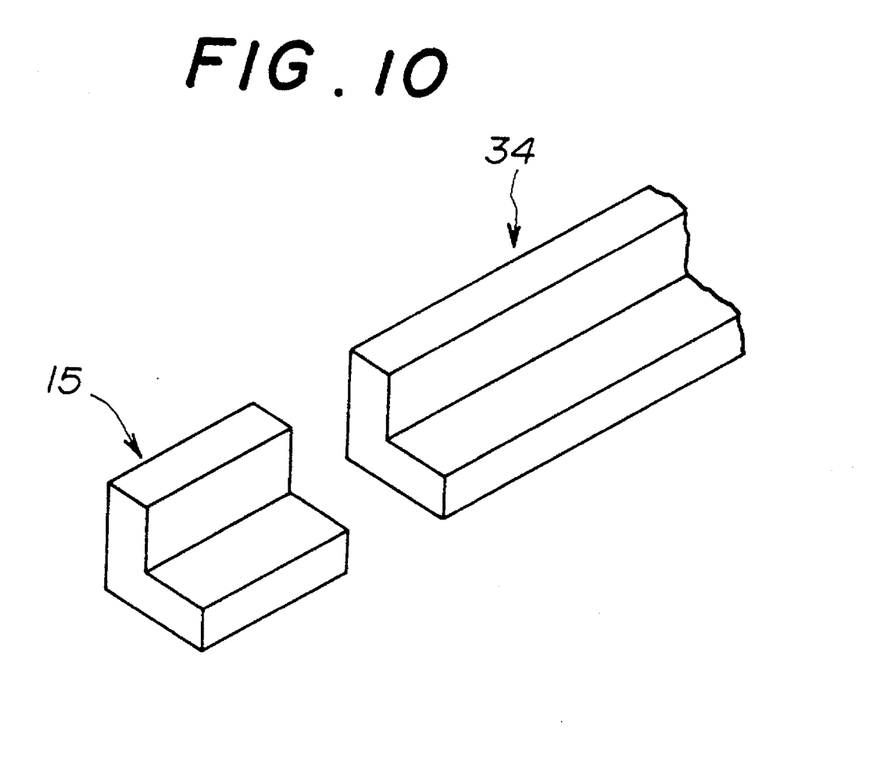
FIG. 10 is a perspective view (4) illustrating one process in a series of processes for fabricating a slider of the magnetic head of the present invention.

Subsequently, as shown in FIG. 9, the block 31 is cut longitudinally along the slots 32 and the sliding contact faces 33 so as to obtain bars 34 having an L-shaped cross section (process 4). The bars 34 are then cut, as shown in FIG. 10, at a given interval to obtain the slider 15 (process 5).

In the magnetic head 13 of the present invention, the L-shaped configuration of the slider 15 is simpler than that of the conventional slider 2 shown in FIG. 1–FIG. 3. Therefore, as mentioned earlier, the number of processes becomes smaller and thus the fabrication of the slider 15 is easier to do than the conventional technology.

Figure 11:
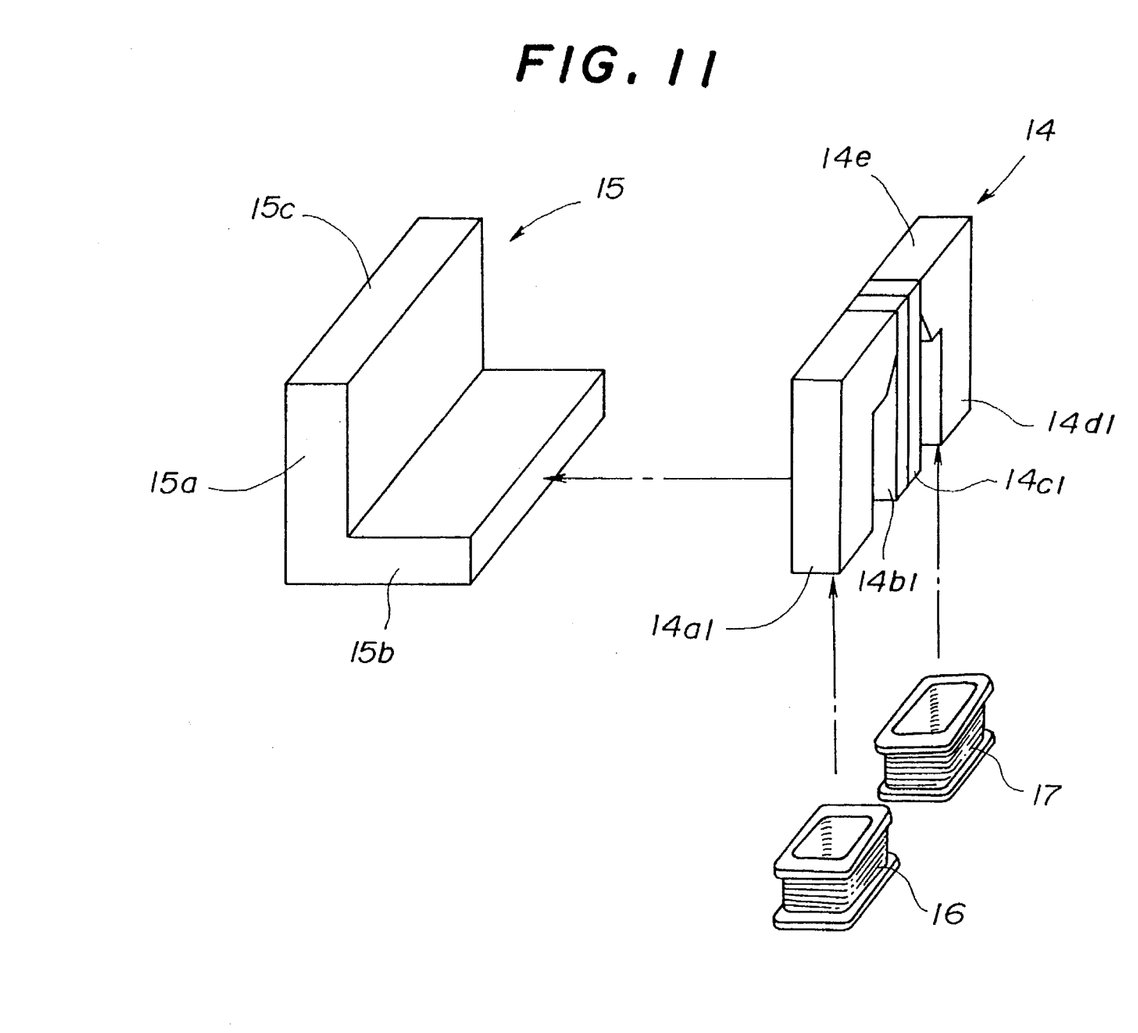
FIG. 11 is an exploded perspective view illustrating an assembly of the magnetic head of the present invention.
Figure 12:
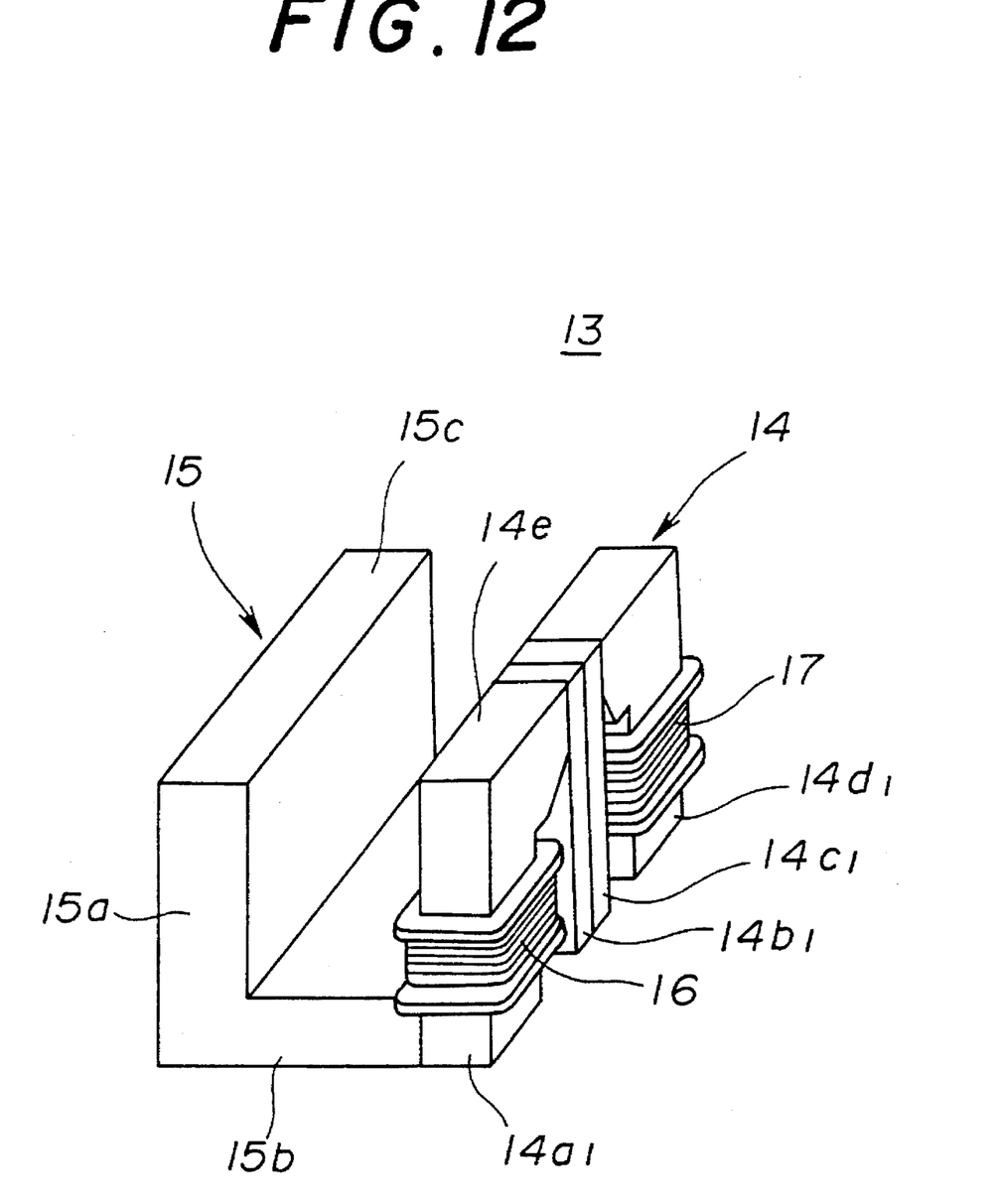
FIG. 12 is a perspective view of the magnetic head of the present invention completely assembled.

As shown in FIG. 11, the coils 16 and 17 are put into position in the core composite 14. The horizontal connect portion 15b of the slider 15 are bonded to the lower lateral face of the core composite 14 to complete an assembly of the magnetic head 13, the final assembled form being shown in FIG. 12. The sliding contact portion 15c and the head face 14e of the magnetic head 13 are mirror finished. The four corners of the end face of the sliding contact portion 15c and the head face 14e, which portions lie in the direction of the disk rotation, in other words in the longitudinal direction, are chamfered, completing the magnetic head 13 shown in FIG. 5.

As described earlier, the slider 15 is made of a magnetic substance, permitting individually provided back cores to be omitted. The processes for bonding individual back cores to the slider 15 can therefore be eliminated. With the number of processes thus being reduced, the number of parts is also reduced. Additionally, because the slider 15 and the core composite 14 are made of the same material, they have the same coefficient of thermal expansion. Therefore, there is no stress arising from the difference of coefficient of thermal expansion in a joint portion of the slider 15 and the core composite 14, and no strain in the core composite 14 due to the stress in the joint portion. Thus a deterioration in a magnetic property of the core composite 14 due to the strain of the core composite 14 is prevented.

While the above embodiment assumed the use of a ferrite in the core composite and the slider, their material is not limited to a ferrite but other magnetic substances are equally usable, of course.

As is evident from the foregoing, the magnetic head of the present invention has the following effects. That is, the slider is made of a magnetic substance and therefore individual back cores are omitted. The number of parts is reduced. In proportion to this reduction, the number of processes in its fabrication can be reduced. A higher efficiency in production is thus ensured.

Further, since the slider and the core are of the same material, there is no difference of coefficient of thermal expansion between the two materials. Accordingly, a deterioration is prevented in a magnetic property of the cores due to a generation of a stress at the joint portion of the slider and the cores. The slider and the cores, of each of the two magnetic heads form a closed magnetic circuit as they hold the magnetic disk, making the magnetic heads impervious to noise effect caused by an external magnetic field.

Moreover, the shape of the slider is simplified, contributing to a substantial reduction of the processes of the slider fabrication. A higher efficiency in production is achieved and the production cost is made cheaper this way. The skid resistance against the magnetic disk is maintained at a low level.

The present invention is not limited to the above described embodiments, and the variations and modifications may be made without departing from the scope of the present invention.

What is claimed is:

1. A magnetic head comprising:
   a head core formed of a plurality of cores each made of a magnetic substance, each of said cores having a sliding surface at one end thereof sliding on a surface of a disk comprising a magnetic recording medium, said plurality of cores cooperatively forming at least one gap, said plurality of cores being aligned along a line of predetermined direction;
   a plurality of coils electromagnetically coupled to said head core; and
   a slider made of a magnetic substance and having an L-shaped cross-section, said slider having a sliding surface located at a first, extended end of said slider, said sliding surface of said slider sliding on the surface of said disk and lying in a plane in which said sliding surface of said head core extends, said slider having a second, extended end connected to the other end of each core of said head core so that said slider is integral with said head core, said sliding surface of said slider extending parallel to the line of direction of said head core but being spaced by an opening from said sliding surface of said core in a direction normal to the line of direction of said head core;
   a closed magnetic circuit being made from said head core, said slider, and said disk as a result of said sliding surface of said head core and said sliding surface of said slider being in contact with said surface of said disk and as a result of said second, extended end of said slider being connected to the other end of said head core.

2. The magnetic head as claimed in claim 1, wherein said slider is made of the same magnetic substance as said head core.

3. The magnetic head as claimed in claim 1, wherein said head core and said slider are fitted on a gimbal plate that supports said magnetic head elastically.

4. The magnetic head according to claim 1, wherein said plurality of cores comprises first and second cores cooperatively forming a write and/or read gap and are U-shaped, and third and fourth cores cooperatively forming an erase gap and are U-shaped.

5. The magnetic head according to claim 1, wherein said opening extends in parallel to each of said sliding surfaces of said head core and said sliding surface of said slider.

6. The magnetic head according to claim 1, wherein said at least one gap of said head core is completely surrounded by said sliding surfaces of said head core.

7. The magnetic head according to claim 1, wherein said slider is made from a single body of material and said sliding surface thereof is a continuous plane.

8. The magnetic head according to claim 1, wherein said cores of said magnetic head comprise L-shaped coil winding cores, each of which includes said one end and a said other end, said one ends of said coil winding cores being contiguous, said other ends of said coil winding cores being spaced from each other, each of said coil winding cores having one of said plurality of coils mounted thereon.

9. A magnetic recording and/or reproducing apparatus comprising:
   first and second magnetic heads, each of which comprises:
   a head core formed of a plurality of cores each made of a magnetic substance, each of said cores having a sliding surface at one end thereof sliding on a surface of a disk comprising a magnetic recording medium, said plurality of cores cooperatively forming at least one gap, said plurality of cores being aligned along a line of predetermined direction;
   a plurality of coils electromagnetically coupled to said head core; and
   a slider made of a magnetic substance and having an L-shaped cross-section, said slider having a sliding surface located at a first, extended end of said slider, said sliding surface of said slider sliding on the surface of said disk and lying in a plane in which said sliding surface of said head core extends, said slider having a second, extended end connected to the other end of each core of said head core so that said slider is integral with said head core, said sliding surface of said slider extending parallel to the line of direction of said head core but being spaced by an opening from said sliding surface of
   said core in a direction normal to the line of direction of said head core;
   said first and second magnetic heads being arranged so as to oppose one another and cooperatively sandwich the disk so that a first closed magnetic circuit is made from said head core and slider of said first magnetic head and said disk, while a second closed magnetic circuit is made from said head core and slider of said second magnetic head and said disk.

10. The magnetic recording and/or reproducing apparatus according to claim 9, wherein said opening extends in parallel to each of said sliding surfaces of said head core and said sliding surface of said slider in each magnetic head of said first and second magnetic heads.

11. The magnetic recording and/or reproducing apparatus according to claim 9, wherein said at least one gap of said head core is completely surrounded by said sliding surface of said head core in each magnetic head of said first and second magnetic heads.

12. The magnetic recording and/or reproducing apparatus according to claim 9, wherein said slider is made from a single body of material and said sliding surface thereof is a continuous plane in each magnetic head of said first and second magnetic heads. heads comprise coil winding cores, on each of which an electric coil is wound.

13. The magnetic recording and/or reproducing apparatus according to claims 9, wherein said cores of said magnetic heads comprise L-shaped coil winding cores, each of which includes said one end and said other end, said one ends of said coil winding cores being contiguous, said other ends of said coil winding cores being spaced from each other, each of said coil winding cores having one of said plurality of coils mounted thereon.

14. The magnetic recording and/or reproducing apparatus according to claim 9, wherein said opening of said first magnetic head faces said opening of said second magnetic head via said disk interposed between said openings.

\* \* \* \* \*

UNITED STATES PATENT AND TRADEMARK OFFICE
CERTIFICATE OF CORRECTION

PATENT NO. : 5,485,336
DATED : January 16, 1996
INVENTOR(S) : Matsunaga

It is certified that error appears in the above-indentified patent and that said Letters Patent is hereby corrected as shown below:

CLAIM 1, Col. 7, Line 51, after "said" insert ---head---; CLAIM 12, Col. 9, Lines 2 & 3, delete". heads comprise coil winding cores, on each of which an electric coil is wound"; CLAIM 13, Col. 9, Line 5, delete "claims" and substitute therefor ---claim---.

Signed and Sealed this

Twenty-first Day of May, 1996

Attest:

BRUCE LEHMAN

*Attesting Officer*    Commissioner of Patents and Trademarks